United States Patent [19]
Westwood

[11] 4,114,037
[45] Sep. 12, 1978

[54] MULTIPLE LENS SYSTEM FOR AN OPTICAL IMAGING DEVICE

[75] Inventor: William Dickson Westwood, Ottawa, Canada

[73] Assignee: Northern Telecom Limited, Montreal, Canada

[21] Appl. No.: 797,509

[22] Filed: May 16, 1977

[51] Int. Cl.² ............................................. H01J 3/14
[52] U.S. Cl. .................................. 250/216; 350/213; 353/30
[58] Field of Search ............... 250/216, 567; 350/114, 350/116, 213; 353/30, 34, 36, 38

[56] References Cited
U.S. PATENT DOCUMENTS

| | | | |
|---|---|---|---|
| 3,113,484 | 10/1963 | Baker | 350/213 X |
| 3,580,675 | 5/1971 | Hieber | 350/213 X |
| 3,877,801 | 4/1975 | MacGovern | 353/38 |

Primary Examiner—Lawrence J. Dahl
Attorney, Agent, or Firm—Sidney T. Jelly

[57] ABSTRACT

An optical imaging device divides a long thin object, such as a line of print, into several sections and arranges the sections into an overlapping image, of area form as compared to the original linear form of the object. A plurality of lenses are used, each lens associated with a particular section of the object. Each lens is tilted relative to the other lenses so that the plane of the lens is perpendicular to the line connecting the center of the related image section and object section, and also displaced in a direction normal to the extent of the line of lenses so that the center of each lens is on the line connecting the center of the related image section and object section. The lenses can extend in a curve to reduce magnification variations from lens to lens, and conveniently the lenses are rectangular and molded as a single unit.

9 Claims, 4 Drawing Figures

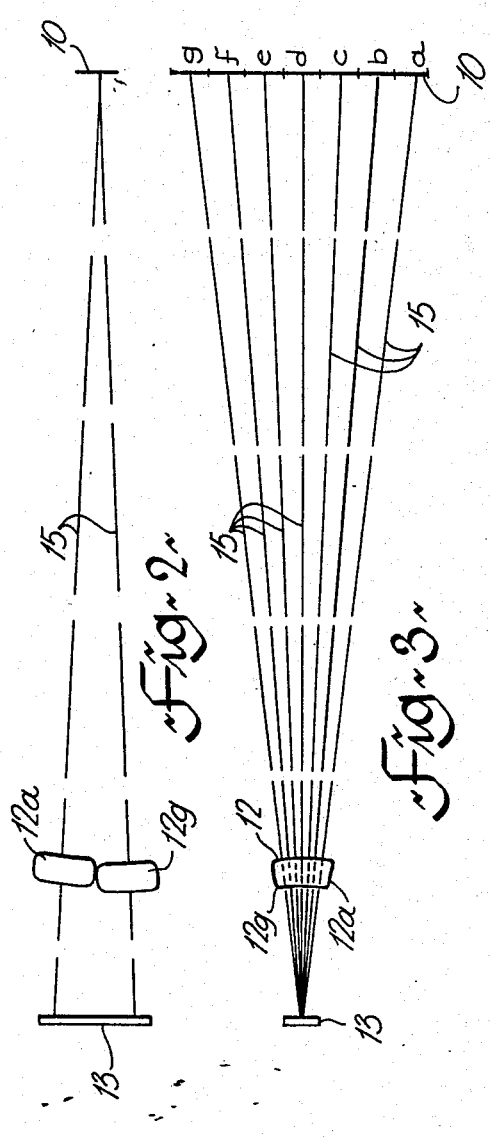
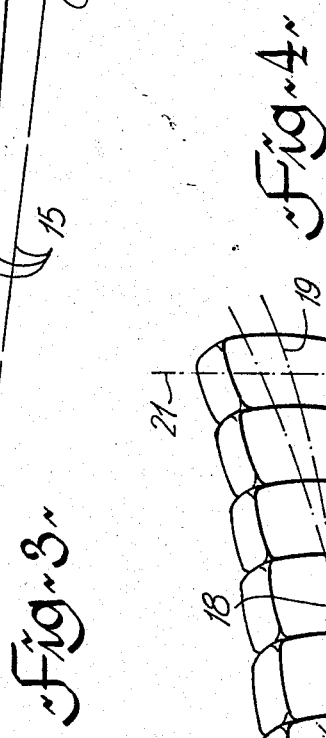
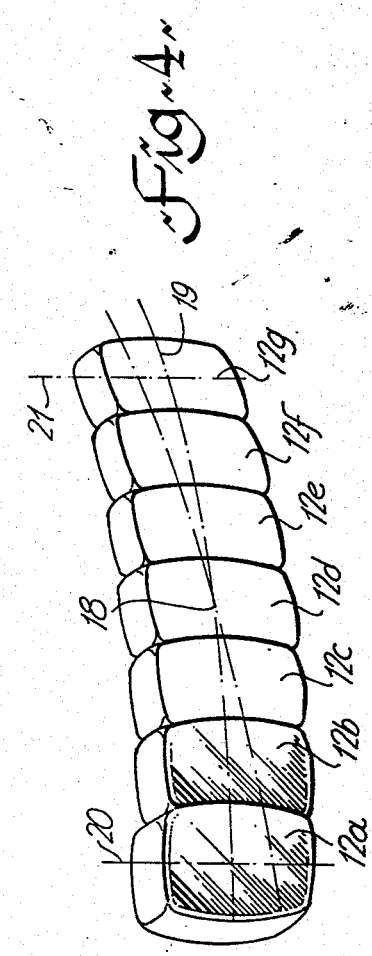
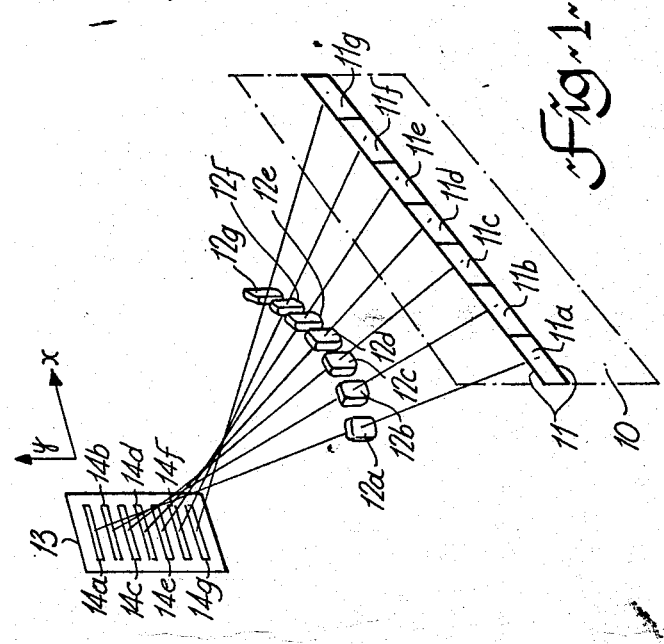

MULTIPLE LENS SYSTEM FOR AN OPTICAL IMAGING DEVICE

This invention relates to a multiple lens system for an optical imaging device and is particularly concerned with such a system to divide a linear object into sections and arrange the sections to give an image of area form, such as for optical scanners in facsimile and similar printing systems.

In a scanner for copying devices, a page is scanned line by line, and signals developed as the line is scanned, indicative of the presence, or absence, of light and dark areas. This is achieved by imaging the line on some form of detector device made up of a number of elements. For example, for high resolution, a device composed of 1728 individual elements in a linear array is used. Each element is very small and there results a long thin device which is fragile and difficult to manufacture.

The present invention provides a multiple lens system which effectively splits the line which is the object, into sections and repositions the sections such that the image is of area form rather than linear form. For example, with seven lenses, the line is divided into seven sections arranged one above the other, thus requiring a device which is only about 1/7th as long.

The invention will be readily understood by the following description in conjunction with the accompanying diagrammatic drawings, in which:

FIG. 1 illustrates the general principle of the invention;
FIG. 2 is a side view of the system of FIG. 1;
FIG. 3 is a plan view of the system of FIG. 1;
FIG. 4 is a perspective view of one form of lens systems.

In FIG. 1, a page is indicated at 10 with a line being indicated as being between the two lines 11. The line is shown as divided into sections 11a to 11g. A plurality of lenses 12a to 12g are provided, in a line, each lens relating with a particular section of the line, ie., lens 12a relating with section 11a, 12b with 11b and so on. An imaging device is indicated at 13, the device having a plurality of detectors arranged in parallel rows 14a to 14g. Again each lens is related with a particular row, lens 12a with row 14a, 12b with 14b and so on. Thus it will be seen that the line 11 is now imaged over an area composed of the seven rows 14a to 14g, instead of one long row.

Considering one particular imager 13, this would consist of seven arrays, each array equaling to one of the rows 14a–g. Assuming a 13 μm centre to centre spacing of elements in the X direction, a 9.8 X magnification is required to give two hundred lines to the inch resolution across the page. For 200 lines per inch resolution in the up and down direction of the page, the centre-to-centre spacing of the elements in the Y direction is also 13 μm. With a chip 0.18 inches long (Y direction), each array would be separated by about 0.015 inches.

The lenses 12a to 12g are arranged so that the centre of each lens lies on a line joining the centre of the related array to the centre of the appropriate line section and also the plane of each lens is perpendicular to this line. Thus the lenses are tilted with respect to each other, their centres displaced in a direction normal to the diameter of the linear extent of the lenses, and also rotated relative to each other.

FIG. 2, a side view of the arrangement of FIG. 1, only shows two extreme lenses 12a and 12g. Also, these two lenses are shown with greater vertical displacement, that is displacement normal to the line of lenses, than is actually the case. This is for reasons of clarity only. Assuming a value of focal length $f \approx 75$mm for each lens, the vertical separation of the lens centres is small. Since the centre to centre spacing of adjacent arrays is 0.015 inch, with the above selected chip size of 0.18 inch in the Y direction, adjacent lens centres are separated by $\approx 0.015$ inch, that is the centres of lenses 12a and 12g are respectively 0.045 inch (1.14mm) above and below the centre of lens 12d. The vertical tilt angle of these two lenses, 12a and 12g, with respect to the centre line, is 0.07°. Thus the seven lenses are almost in a horizontal line.

The horizontal displacement of the lenses is indicated in FIG. 3, which is a plan view. The angle between the two end lenses, 12a and 12g, and the centre lens (12d), is 5.9° and the displacement of these lens centres (12a and 12g) from the centre is 9.2mm. Thus the maximum width of each lens is $\approx 3$mm. With a single lens, and linear imaging, lamp power and imager sensitivity limit the lens to a minimum aperture of about F11, corresponding to a 7mm diameter lens with $f \approx 75$mm. In the present invention, if circular lenses of 3mm diameter are used, the power incident on the imager will be less than 20% of that obtained with the single lens system. With rectangular lenses, approximately 7mm × 3mm, the power on the imager will be about 50% of that of the single lens system and will give an acceptable system. Increasing the light intensity on the page, by some means, will improve this value.

It will also be seen, from FIG. 3, that the total distance from the page 10 to the imager 13 is greater for lenses 12a and 12g than lens 12d. While the depth of field of the long optical path will keep the image in focus if each lens has the same ($f = 75$mm) focal length, the magnification will be slightly different for each lens and the related line section. Thus, for example, in an arrangement in which the distance from the page 10 to the lens centre is 810mm, and the mean distance from the lens centre to the imager is 89mm, the distance from lens 12d to the imager 13 is $\approx 5$mm longer than the distance from lens 12d, which introduces a 5% increase in magnification, that is, the resolution will be about 210 lines per inch instead of 200 lines per inch. This would introduce slight distortion into the print copy. It is possible to adjust the focal length of each lens to compensate for the longer path. For lens 12a, $f \approx 75.4$mm and the distance from the imager would be 83.1mm rather than 82.7mm for lens 12d. This is a small variation and can be accommodated. As a result, the lenses are rotated relative to each other, the lenses in a curve.

However, the degree to which adjustment is made to the lenses will depend to a large extent on the accuracy required. For many purposes minimal adjustments will need to be made to the individual lenses to provide an acceptable image. No adjustments may be necessary after assembly and the lenses can be made as one unit.

In both FIGS. 2 and 3, only the centre lens of the various optical paths are indicated, at 15.

FIG. 4 illustrates in greater detail one form of lens, taking the above adjustments into account. The lens system or array comprises seven lenses 12a to 12g. The array is approximately 9mm high and 21mm wide, with the individual lenses 7mm high × 3mm wide. The axis coincident with, or parallel to, the axis of the line on the page is indicated at 18 while the axis joining the centres of the lenses is indicated at 19. This indicates the vertical displacement on displacement in the direction normal to the linear extent of the lenses. The lenses are also on a curve, with the centre lens, 12d slightly closer to the page than lenses 12a and 12g, as described above. Finally the lenses are tilted relative to each other, as indicated by the axes 20 and 21 of lenses 12a and 12g respectively. The focal length of the lenses can vary, as described above, with $f=75.4$mm for lenses 12a and 12g and $f=75$mm for lens 12d, the intermediate lenses varying between these two values. Such an array can be made by plastic molding. The tilt and vertical displacement are critical in that these are responsible for the correct positioning of the image sections. The criticality will depend on the size of the detector devices for the image but is likely to be quite critical. The rotation, or positioning on an arc, is related to the magnification, and may be less critical. Depending upon the system it may be possible to ignore this requirement.

With an arrangement as described, the illuminated area imaged must be confined, either by focussing the light on to the page itself, or by positioning a slit close to the page to limit the area illuminated.

The arrangement has other advantages in addition to providing imaging in an area form rather than a linear form. It is possible to obtain data from two adjacent lines simultaneously. Thus, as an example, each array is composed of two lines of elements, each line having, for example 256 elements. Such arrays serve several purposes. Thus, even with high accuracy in manufacture and assembly, it can well be that the sections 14a to 14g will not fall exactly on the desired position; there may be some vertical displacement. By providing two, or more, lines of elements, a section will always be on a line of elements and electronic means can be provided for actually scanning the correct line of elements. With two or more lines of elements, instead of a line being scanned completely and signals transmitted for every element, a second line can be compared to a previous line, and only changes detected and transmitted. This can reduce transmission time.

Similarly by providing, for example 256 elements, instead of 247, ($\simeq$1/7th of 1728) some overlap is provided for lateral misalignment. Again electronic means can be provided to avoid overlapping transmission once printing. By imaging several lines at one time, it would be possible to read a number of lines at one time, reducing the stepping of the scan bar.

The field of view of each lens is considerably reduced so that the image of each lens need be flat over, for example only 3mm instead of 25mm. This may simplify lens fabrication. The chip size is more compatible with conventional processing and avoids complex procedures such as butting photo masks for producing a 1728 element linear imager. Processing yields will be higher. A particular form of imager is one using charge coupled devices (CCD's).

Although a lens system having seven lenses has been described, it will readily be appreciated that other numbers of lenses can be used. The minimum number will be decided by the degree to which the shape of the chip is to be changed from a long thin one. The number of rows of elements in each array will influence this also. Higher numbers of lenses will increase the complexity and manufacturing difficulties.

What is claimed is:

1. A multiple lens system for an optical imaging device for optically dividing a linear object into sections and imaging said sections in a stacked relationship, comprising:

a plurality of lenses extending in a side-by-side arcuate array in a direction corresponding to the longitudinal axis of the linear object, a lens for each section;

a photo-detector imager having a plurality of sections attached one above the other in a direction normal to the longitudinal axis of the linear object, an imager section for each lens;

each lens having its central axis on a line extending between centre points of the related object section and imager section and tilted to position the plane of the lens normal to said line;

whereby each object section is imaged on a related imager section in a substantially 100% overlapping relationship with the other object sections.

2. A lens system as claimed in claim 1, each lens of substantially rectangular form on its plane.

3. A lens system as claimed in claim 2, said lenses in a contiguous array.

4. A lens system as claimed in claim 3, said lenses molded as a single unit.

5. A lens system as claimed in claim 1, the focal length of each lens compensated to provide said substantially constant magnification.

6. A lens system as claimed in claim 1, said photo-detector imager having a plurality of photo-detectors arranged in parallel rows, a row for each section of the image.

7. A lens system as claimed in claim 6, each row comprising a single line of photo-detector elements.

8. A lens system as claimed in claim 6, each row comprising a plurality of lines of photo-detector elements.

9. A lens system as claimed in claim 6, said plurality of photo-detectors composed of a plurality of charge coupled devices.

* * * * *